July 15, 1947.   G. E. DATH   2,423,876
SPRING AND FRICTION BUFFER FOR RAILWAY CARS
Filed Oct. 11, 1944   2 Sheets-Sheet 1
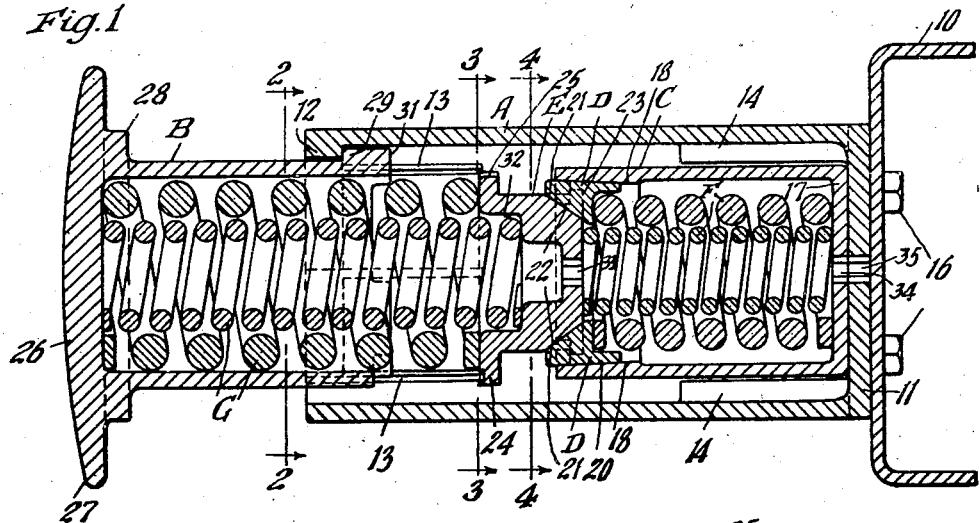
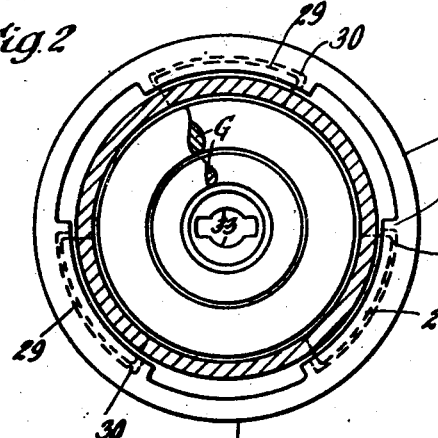
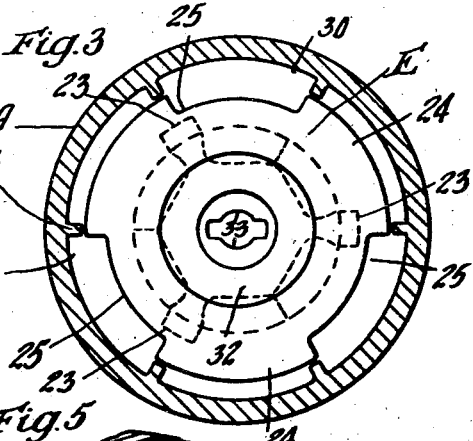
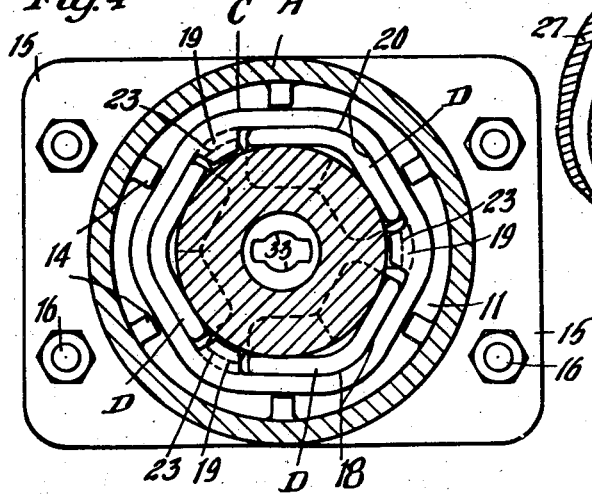
Inventor
George E. Dath
By Henry Fuchs
Atty.

July 15, 1947.  G. E. DATH  2,423,876
SPRING AND FRICTION BUFFER FOR RAILWAY CARS
Filed Oct. 11, 1944  2 Sheets-Sheet 2
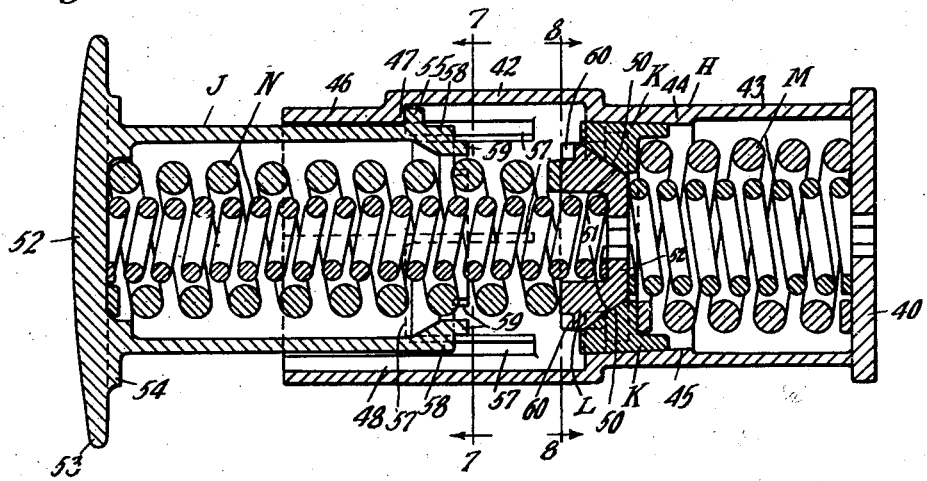
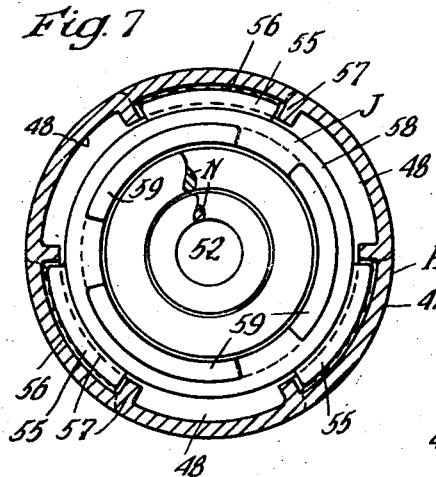
Inventor
George E. Dath
By Henry Fuchs
Atty.

Patented July 15, 1947

2,423,876

UNITED STATES PATENT OFFICE 2,423,876

SPRING AND FRICTION BUFFER FOR RAILWAY CARS

George E. Dath, Mokena, Ill., assignor to W. H. Miner, Inc., Chicago, Ill., a corporation of Delaware Application October 11, 1944, Serial No. 558,114

8 Claims. (Cl. 213—221)

1

This invention relates to improvements in buffers for railway cars.

One object of the invention is to provide a buffer mechanism for railway cars having preliminary spring action to absorb the lighter shocks to which the mechanism is subjected in service, followed by high frictional resistance action to take care of exceptionally great shocks.

A further object of the invention is to provide a buffer mechanism for railway cars comprising a housing secured to the end of the car; a slidable buffer head telescoped within the housing; a friction shock absorber within the housing; and a preliminary spring resistance interposed between the buffer head and the friction shock absorber, wherein the buffer head and the housing have interlocking means holding the parts assembled and limiting lengthwise separation of the head and housing, automatically maintained in operative condition to interlock the parts when the mechanism has once been assembled.

A more specific object of the invention is to provide a mechanism, as specified in the preceding paragraph, wherein the friction shock absorber includes a friction casing and a spring resisted friction clutch slidable within the casing and wherein the means for interlocking the parts comprises cooperating stop lugs on the buffer head and housing which are adapted to be brought into engaging relation by relative rotary displacement of the head and housing in the operation of assembling the mechanism, and are maintained in said relation jointly by holding the head and housing against relative rotation through the instrumentality of guide grooves on the housing within which the lugs are confined to sliding movement lengthwise of the housing, and interengaging locking means of lug and notch formation on the clutch of the friction shock absorber and the buffer head.

Other objects of the invention will more clearly appear from the description and claims hereinafter following.

In the drawings forming a part of this specification, Figure 1 is a longitudinal, vertical sectional view of my improved buffing mechanism, illustrating the same mounted in position on the end of a railway car. Figures 2, 3, and 4 are transverse, vertical sectional views, corresponding respectively to the lines 2—2, 3—3, and 4—4 of Figure 1. Figure 5 is a perspective view of the buffing head of my improved mechanism shown in Figures 1, 2, 3, and 4, the front end portion of said head being partly broken away. Figure 6 is a view similar to Figure 1, illustrating another

2 embodiment of the invention. Figures 7 and 8 are transverse, vertical sectional views, corresponding respectively to the lines 7—7 and 8—8 of Figure 6.

In said drawings, 10 indicates a portion of the end wall of a railway car, the portion illustrated being to one side of the longitudinal center line of the car and having my improved buffing mechanism mounted thereon. As will be understood, the buffing mechanism is duplicated at the other side of the end of the car and the two mechanisms cooperate in a well-known manner with a pair of similar buffing mechanisms on the end of an adjacent car.

Referring first to the embodiment of the invention illustrated in Figures 1 to 5 inclusive, my improved buffing mechanism comprises broadly a housing A; a buffer head B; a friction casing C; three friction shoes D—D—D; a wedge block E; a spring resistance F within the casing C yieldingly opposing inward movement of the wedge and friction shoes; and a preliminary spring resistance G opposing inward movement of the buffing head.

The housing A is in the form of a cylindrical shell open at its front end and closed by a transverse wall 11 at the rear end. At the open front end, the housing A has inturned stop flanges 12—12—12. The stop flanges 12—12—12 are equally spaced annularly of the open end of the housing, thereby providing openings therebetween. At said open end, extending inwardly from the flanges 12—12—12, the housing A is provided with a plurality of longitudinally extending guide ribs 13—13. The guide ribs 13—13 are six in number, being arranged in pairs, the members of each pair being at opposite end edges of the flanges 12—12—12, thereby providing guideways between the ribs of each pair aligned with the corresponding inturned stop flange 12. The housing A is further provided with a plurality of internal centering ribs 14—14 at the rear end thereof extending from the side wall and arranged lengthwise of the housing. The ribs 14—14 are six in number and are adapted to engage with the casing of the friction shock absorber to center the latter. The rear wall 11 of the housing A is laterally extended at opposite sides of the housing to provide securing flanges 15—15 by which the housing is mounted on the end wall 10 of the car. The housing is secured to said end wall in any suitable manner, preferably by bolts 16—16 extending through said wall and the flanges 15—15 of the housing.

The casing C, the friction shoes D—D—D, the wedge E, and the spring resistance F form the complete friction shock absorber, which is mounted within the housing A of the buffing mechanism. The casing C of the friction shock absorber is in the form of a tubular shell of hexagonal, transverse cross section, closed at the rear end by a transverse wall 17. At the front end of the casing C, the walls thereof are thickened inwardly and said thickened portions are provided with longitudinally extending, inwardly converging friction surfaces 18—18—18 of V-shaped transverse section, each friction surface being formed by two adjacent inner side faces of the hexagonal wall of the casing. At the front end thereof, the casing C is further provided with a plurality of inturned stop lugs 19—19, which are alternated with the V-shaped friction surfaces of the casing, that is, the lugs 19 are three in number and are located between adjacent friction surfaces.

The friction shoes D are three in number and cooperate respectively with the three friction surfaces of the casing C, each shoe having an outer, V-shaped friction surface 20 engaged with the corresponding V-shaped friction surface 18 of the casing. On the inner side, each shoe has a flat wedge face 21, the wedge faces of the three shoes converging inwardly toward the central longitudinal axis of the mechanism.

The wedge block E is provided with three wedge faces 22—22—22 at the inner end thereof, which respectively engage the wedge faces 21—21—21 of the three shoes D—D—D. The wedge E is further provided with three laterally outwardly projecting retaining lugs 23—23—23 which extend between adjacent shoes and are adapted to engage with the stop lugs 19—19—19 of the casing C to limit outward movement of the wedge and hold the same assembled with the casing. At the outer end, the wedge block E has a laterally outwardly projecting, annular flange 24 adapted to receive the actuating force from the buffer head B. The flange 24 is provided with three recesses or notches 25—25—25, forming locking seats for a purpose hereinafter pointed out. The notches 25—25—25 are spaced equally circumferentially of the flange.

The spring resistance F comprises a relatively heavy, outer coil and a light inner coil, the inner coil bearing at its front and rear ends respectively on the inner end of the wedge block E and the transverse end wall 17 of the casing, and the outer coil bearing at its front and rear ends respectively on the inner ends of the shoes D—D—D and said transverse rear wall of the casing. The hexagonal casing C of the friction shock absorber fits between the ribs 14—14 of the housing A, that is, the inner edges of the ribs 14—14 bear on the flat, hexagonal face portions of the casing, thereby preventing rotary displacement of the casing with respect to the housing. The shoes D of the friction shock absorber are held against rotation with respect to the casing C by the interengaging, V-shaped formation of the friction surfaces of the shoes and casing, and the wedge E is held against rotation with respect to the shoes by virtue of the interengaging flat wedge faces of these members and the lugs 23 which are engaged between adjacent shoes.

The buffing head B is in the form of a cylindrical, tubular sleeve, open at the rear end and closed at its front end by a transverse, relatively thick wall 26. The wall 26 is extended laterally outwardly of the cylindrical sleeve, thereby providing an annular flange 27, which forms the circular buffing plate of the buffing mechanism. As illustrated, the outer surface of the circular buffing plate is of convex contour to properly cooperate with the buffing head of an adjacent car. Adjacent the flange 27, the cylindrical sleeve portion of the buffer head B is outwardly thickened to provide a rearwardly offset, annular seat 28 adapted to abut the front end of the housing A to limit the compression stroke of the mechanism. At the inner end, the sleeve portion of the buffer head B is provided with three laterally outwardly projecting, relatively heavy lugs 29—29—29, which are adapted to cooperate with the inturned stop flanges 12 at the open end of the housing A to limit outward movement of the head. The lugs 29—29—29 are guided within the guideway 30 formed by adjacent ribs 13—13 of the housing A and are limited to lengthwise movement of the housing by said ribs. At the rear end, the wall of the tubular portion of the buffer head B is cut out, to provide three equally spaced, rearwardly projecting lugs 31—31—31, which form, in effect, continuations of the lugs 29—29—29. The lugs 31—31—31 are aligned with the notches 25—25—25 of the flange of the wedge E to lock the head B against rotation with respect to the housing A when the lugs 29—29—29 leave the guideways 30—30—30 of the housing. The inner end of the sleeve portion of the buffer head B is adapted to engage the flange 24 of the wedge E to force the latter inwardly after a predetermined inward movement of the buffing head B and compression of the preliminary spring G.

The preliminary spring G comprises a relatively light, inner coil having its front and rear ends bearing respectively on the inner side of the transverse front wall 26 of the buffer head and a seat 32 at the front of the wedge E, and a relatively heavy, outer coil seated at its front and rear ends respectively on the inner side of the wall 26 of the buffer head B and the front end or flange portion of the wedge E.

In assembling the improved buffing mechanism, the friction shock absorbing mechanism, comprising the friction casing C, friction shoes D—D—D, wedge block E, and spring resistance F, is first placed within the housing A and compressed. The friction shock absorbing mechanism is preferably held in the compressed condition by a T-headed retainer bolt which extends through aligned openings 33, 34, and 35 in the wedge E, rear wall 17 of the casing, and the rear wall 11 of the housing. All three of these openings are transversely elongated to permit passage of the T-head of the bolt therethrough. The preliminary spring G is then placed on the wedge E and the buffing head B telescoped within the housing A over the spring G, the head being turned to a position so that the flanges 29—29—29 thereof will pass between the flanges 12—12—12 of the head of the housing A. The buffing head is pushed inwardly against the resistance of the spring G until the flanges 29—29—29 clear the rear or inner ends of the ribs 13—13. This operation may be readily performed due to the clearance provided by the compressed friction shock absorber which is held in such compressed condition by the bolt, as hereinbefore pointed out. After the buffer head B has been forced inwardly of the casing to clear the inner ends of the ribs 13—13, the head is turned to align the flanges 29—29—29 with the flanges 12—12—12 of the housing A, that is, bring the flanges 29—29—29 into alignment with the guideways 30—30—30. In this position of the buffer head B, the lugs 31—31—31 thereof are aligned with the notches or seats 25—25—25 of the wedge E. With the parts thus assembled, the bolt is removed by withdrawing the same through the rear end of the housing A, thus permitting the friction shock absorbing device to expand. To remove the bolt, the nut is disengaged therefrom and the bolt turned to align the T-head thereof with the openings 33, 34, and 35 of the wedge E, casing C, and housing A to freely pass through said openings.

The operation of my improved buffing mechanism is as follows: Upon inward movement of the buffing head B through pressure exerted thereon by any object, such as the buffing head of an adjacent car, the preliminary spring G is compressed against the wedge E, thus absorbing the lighter shocks. When heavier shocks are encountered, the head B is forced further inwardly and the inner end of the sleeve of the same engages the wedge E and forces the latter inwardly of the friction casing, thus wedging the shoes apart, pressing the same against the friction surfaces of the casing and forcing them inwardly against the resistance of the spring F. High frictional resistance is thus provided during the time that the friction shock absorber is operated.

When the actuating pressure is removed, the expansive action of the spring F forces the friction shoes and wedge outwardly until movement of the wedge is limited by shouldered engagement with the lugs 19—19—19 of the casing C and the expansive action of the spring G forces the buffing head B outwardly until limited by engagement of the flanges 29 thereof with the flanges 12 of the housing.

In this connection it is pointed out that during both the entire compression stroke and release action of the mechanism, the head B is effectively interlocked with the housing A to guard against accidental separation of these parts, the flanges 29—29 of the head B being guided in the guideways 30—30 formed by the ribs 13—13 of the housing A and the lugs 31 of the head B being engaged within the notches 25 of the wedge E before the flanges 29 of the head B pass rearwardly beyond the ribs 13—13 of the housing in the compression stroke of the mechanism, and the flanges 31—31 remaining engaged with the notches of the wedge until the flanges 29—29 have entered between the ribs 13—13 in the expansion stroke of the mechanism.

Referring next to the embodiment of the invention illustrated in Figures 6, 7, and 8, my improved buffer mechanism comprises a housing H; a buffer head J; three friction shoes K—K—K; a wedge block L; a spring resistance M; and a preliminary spring resistance N.

The housing H is in the form of a hollow casing closed by a transverse, vertical rear end wall 40. The wall 40 is extended laterally outwardly beyond the housing at opposite sides thereof to provide flanges 41—41 for securing the housing to the end of a railway car. The forward end portion of the housing H is of cylindrical, transverse cross section, as indicated at 42, and rearwardly of said cylindrical portion 42, the housing is of hexagonal, transverse cross section, thereby providing a friction shell portion 43 of hexagonal shape. At the forward end of the shell portion 43, where it joins the cylindrical portion of the housing H, the walls are interiorly thickened, as indicated at 44. At said thickened wall portion 44 of the shell 43 are provided three interior, inwardly converging friction surfaces 45—45—45 of V-shaped, transverse cross section, each surface 45 being formed by two adjacent, interior face portions of the wall of the hexagonal shell. At the extreme forward end, the cylindrical portion of the housing H has the walls thereof inwardly offset at spaced intervals, as indicated at 46, thereby providing transverse stop shoulders 47. The shoulders 47 are preferably three in number. Between the shoulders 47 the offset arrangement of the front end of the housing provides three guide passages 48—48—48, which are of greater width than the shoulders, as clearly shown in Figure 7.

The friction shoes K, which are three in number, cooperate with the V-shaped friction surfaces 45 of the friction shell. Each friction shoe K has a friction surface 49 on the outer side thereof of V-shaped, transverse cross section engaging the corresponding V-shaped friction surface of the shell. On the inner side, each shoe has a wedge face 50, the faces 50 of the three shoes converging inwardly or rearwardly of the shell 43.

The wedge L is in the form of a block having three rearwardly converging wedge faces 51—51—51 at the inner end thereof which engage the wedge faces 50—50—50 of the three friction shoes. To limit outward movement of the wedge L and hold the same in assembled relation with the housing H, three radial lugs 61 are provided on the wedge which extend between adjacent shoes and engage in back of three interior lugs 62—62—62 of the shell 43, said lugs being at the front ends of the friction surfaces 45 thereof.

The buffer head J comprises a cylindrical sleeve which is open at the rear end and closed at the front end by a transverse wall 52. The wall 52 extends laterally outwardly of the cylindrical sleeve portion of the buffing head, thereby providing an annular flange 53, which forms a continuation of the wall 52. The wall 52, together with the flange 53, forms the buffer head proper of the mechanism. Where the buffer head proper joins with the cylindrical sleeve portion thereof, the wall of the sleeve is slightly enlarged or thickened, thereby providing an annular, rearwardly facing seat 54, adapted to engage the front end of the housing H to limit inward movement of the buffing head. At the inner end, the sleeve portion of the buffer head J is provided with three laterally outwardly extending retaining lugs or flanges 55—55—55, which are spaced equally circumferentially of the sleeve. The lugs 55—55—55 of the sleeve of the buffer head are guided for lengthwise movement in guideways 56—56—56, formed by lengthwise extending ribs 57—57, 57—57, and 57—57 on the interior of the cylindrical portion of the housing H immediately to the rear of the stop shoulders 47—47—47 thereof. Each pair of ribs 57—57 extends rearwardly from opposite ends of the corresponding stop shoulder 47. The ribs 57—57 are of such a length that the lugs 55—55—55 of the buffer head J may be engaged in back of the inner ends of the ribs in assembling the buffer head with the housing H, in a manner similar to that described in connection with the invention disclosed in Figures 1 to 5 inclusive. The peripheral wall of the sleeve portion of the buffer head J is thickened at the inner end of the sleeve, as indicated at 58, and rearwardly projecting lugs 59 extend from said thickened portion. The lugs 59 are inwardly offset with respect to the outer surface of the side wall of the shell of the buffer head. The lugs 59 are engageable within three seats 60—60—60 at the forward end of the wedge block L. The parts are so proportioned that the lugs 59 of the buffer head J engage within the seats 60—60—60 of the wedge before the lugs 55—55—55 of the buffer head leave the guideways 56 between the ribs 57—57.

The spring resistance M comprises inner and outer coils bearing at their rear ends on the transverse wall 40 of the housing H and at their forward ends on the inner ends of the wedge L and the shoes K, respectively. The spring resistance M is preferably under initial compression in the assembled condition of the mechanism.

The spring N, which forms the preliminary spring of the mechanism, comprises inner and outer coils seated at their front or outer ends on the transverse wall 52 of the buffer head J and at their inner ends on the wedge L, the inner spring being seated within a depression formed in the wedge.

The assembling operation of the mechanism disclosed in Figures 6, 7, and 8 is substantially the same as that employed in connection with the device disclosed in Figures 1 to 5 inclusive, with the exception that the friction casing shown in Figures 1 to 5 inclusive is omitted, the friction shell of the mechanism being formed integral with the housing H in Figures 6, 7, and 8.

I have herein shown and described what I now consider the preferred manner of carrying out my invention, but the same is merely illustrative and I contemplate all changes and modifications that come within the scope of the claims appended hereto.

I claim:

1. In a buffer for railway cars, the combination with a housing open at one end and closed at the other end; of a buffer head slidingly telescoped within the housing; shock absorbing means within the housing yieldingly opposing inward movement of the buffer head, said shock absorbing means including a friction casing locked against rotation with respect to the housing, friction shoes slidable within said casing and limited to lengthwise movement with respect to the same, a wedge block in wedging engagement with the shoes, said wedge and shoes having interengaging flat wedge faces, and spring means within the casing opposing inward movement of the wedge and shoes; a buffer head slidingly telescoped within the open end of the casing; cooperating stop lugs on said housing and head limiting outward movement of the head; internal guideways on the housing with which said lugs of the head are slidingly engaged during a predetermined portion of the compression stroke of the mechanism to limit the latter to lengthwise movement with respect to the housing; and interengaging, cooperating lugs and notches on said buffing head and wedge engageable with each other upon compression of the mechanism beyond said predetermined portion of the compression stroke, locking said head against rotation with respect to the wedge.

2. In a buffer for railway cars, the combination with a housing open at one end and closed at the other end; of a buffing head slidingly telescoped within the housing; shock absorbing means within the housing yieldingly opposing inward movement of the buffing head, said shock absorbing means comprising a preliminary spring resistance and a friction shock absorber, said friction shock absorber including a spring resisted friction clutch comprising a wedge block locked against rotation with respect to the housing; cooperating stop lugs on said housing and buffing head limiting outward movement of the head; internal guideways on the housing with which said lugs of the head are slidingly engaged, while said mechanism is being compressed to a predetermined extent less than the full compression stroke thereof, to limit movement of the latter to movement in a direction lengthwise with respect to the housing; and interengaging, cooperating locking lugs and notches on said buffing head and wedge engageable with each other when said mechanism is compressed beyond said predetermined extent to lock said head against rotation with respect to the wedge.

3. In a buffer for railway cars, the combination with a housing open at the front end and closed at the rear end, said housing having longitudinally extending, internal guideways at said open end and stop shoulders at the outer ends of said guideways; of a buffer head including a rearwardly projecting sleeve closed at its front end, said sleeve being slidingly telescoped within the open end of the housing; laterally outwardly projecting stop flanges on said sleeve at the inner end thereof slidingly engaged within said internal guideways while said mechanism is being compressed to a predetermined extent less than the full compression stroke thereof; a friction shock absorber within the housing buttressed against the closed end of the housing, said friction shock absorber including a pressure transmitting wedge at the front end thereof locked against rotation with respect to said housing; interlocking lugs and notches on said wedge and sleeve engageable with each other upon compression of the mechanism beyond said predetermined extent to lock said wedge and sleeve against relative rotation; and spring means yieldingly resisting relative movement of said friction shock absorber and buffer head toward each other.

4. In a buffer for railway cars, the combination with a housing open at the front end and closed at the rear end, said housing having longitudinally extending, internal guideways at said open end and stop shoulders at the outer ends of said guideways; of a buffer head including a rearwardly projecting sleeve closed at its front end, said sleeve being slidingly telescoped within the open end of the housing; laterally outwardly projecting stop flanges on said sleeve at the inner end thereof slidingly engaged within said internal guide grooves; a friction casing within the housing buttressed against the closed end of the housing and locked against rotation with respect to said housing; friction shoes having sliding frictional engagement with the interior of the casing and locked against rotation with respect to the casing; a pressure transmitting wedge having flat wedge faces engaging flat wedge faces on the shoes; a laterally projecting, annular flange at the front end of said wedge, said flange being notched; a spring within said casing opposing inward movement of the wedge and shoes; a spring interposed between said wedge and the closed end of the sleeve of the buffer head, said wedge being engaged and actuated by the inner end of said sleeve after a predetermined compression of the mechanism; and lugs on said sleeve engageable with the notches of the wedge to lock the buffer head and wedge against relative rotation.

5. In a buffer for railway cars, the combination with a housing open at one end and closed at the other end; of a buffer head slidingly telescoped within the housing, said housing including a friction casing member; friction shoes slidable within said casing and limited to lengthwise movement with respect to the same; a wedge block in wedging engagement with the shoes, said wedge block and shoes having interengaging flat wedge faces; spring means within the casing opposing inward movement of the wedge and shoes; cooperating lugs on the housing and buffer head for limiting outward movement of the head; internal guideways on the housing with which said lugs of the head are slidingly engaged to limit the latter to lengthwise movement with respect to the housing, said buffer head being movable inwardly of the housing to an extent to move said lugs beyond the inner limits of said guideways; interengaging cooperating locking lugs and notches on said buffer head and wedge engageable with each other when said lugs are moved beyond the inner limits of said guideways head against relative rotation with respect to the wedge; and additional spring means opposing relative movement of the buffer head and wedge toward each other.

6. In a buffer for railway cars, the combination with a housing open at one end and closed at the other end; of a buffer head slidingly telescoped within the housing, said housing including a friction casing; a spring resisted friction clutch slidable within the casing, said clutch including a wedge block held against rotation with respect to the housing; cooperating stop lugs on said housing and buffer head limiting outward movement of the head; internal guideways on the housing with which said lugs of the head are slidingly engaged to limit the latter to movement lengthwise with respect to the housing, said guideways being of restricted length to permit said lugs to pass out of said guideways when the mechanism is compressed beyond a predetermined extent; interengaging cooperating locking lugs and notches on said buffer head and wedge engageable with each other when said mechanism is compressed beyond said predetermined extent to lock said head against rotation with respect to the wedge; and spring means yieldingly opposing relative movement of the buffer head and wedge toward each other.

7. In a buffer for railway cars, the combination with a housing open at the front end and closed at the rear end, said housing having longitudinally extending, internal guideways at said open end and stop shoulders at the outer ends of said guideways, said guideways being open at their rear ends, said housing having interior friction surfaces; of a buffer head including a rearwardly projecting sleeve closed at its front end, said sleeve being slidingly telescoped within the open end of the housing; laterally outwardly projecting stop flanges on said sleeve at the inner end thereof slidingly engaged within said internal guideways, said buffer head being movable inwardly to an extent to move said flanges out of said guideways beyond the rear limits thereof to disengage the lugs from said guideways; friction shoes having friction surfaces engaging the friction surfaces of the housing, said cooperating friction surfaces of the housing and shoes being of V-shaped, transverse cross section; a pressure transmitting wedge having flat wedge faces engaging flat wedge faces on said shoes, said wedge having peripheral seats, said wedge being engaged and actuated by the inner end of the sleeve of the buffer head after a predetermined compression of the mechanism; lugs on said sleeve engageable within the seats of the wedge to lock the buffer head and wedge against relative rotation when said buffer head has been moved inwardly to an extent to disengage the flanges thereof from said guideways; a spring opposing inward movement of the shoes and wedge with respect to the housing; and additional spring means yieldingly resisting relative movement of the wedge and buffer head toward each other.

8. In a buffer for railway cars, the combination with a housing adapted to be secured to the car; of a friction shock absorber within the housing including a wedge block movable lengthwise of the mechanism and held against rotation with respect to the housing; a buffer head slidingly telescoped within the housing; cooperating means on the housing and buffer head holding said head against rotation with respect to the housing during the major portion of the compression stroke of the mechanism; interengaging means on said buffer head and wedge block to lock said head against rotation with respect to said block during the remainder of the compression stroke of the mechanism; and spring means interposed and reacting between the buffer head and the friction shock absorber.

GEORGE E. DATH.

REFERENCES CITED

The following references are of record in the file of this patent:

UNITED STATES PATENTS

| Number | Name | Date |
|---|---|---|
| 2,354,826 | Olander | Aug. 1, 1944 |
| 1,852,567 | Hazeltine | Apr. 5, 1932 |
| 2,146,015 | Hazeltine | Feb. 7, 1939 |
| 2,291,831 | Olander | Aug. 4, 1942 |